Nov. 12, 1968   R. H. PINTELL   3,411,104

COMPACT CONDENSER STRUCTURE AND CIRCUIT INCORPORATING SAME

Filed Dec. 19, 1966   2 Sheets-Sheet 1

INVENTOR:
Robert Pintell

BY  Karl F. Ross
    *Attorney*

Robert Pintell
INVENTOR.
BY
Karl G. Ross
Attorney

United States Patent Office 3,411,104
Patented Nov. 12, 1968

3,411,104
COMPACT CONDENSER STRUCTURE AND CIRCUIT INCORPORATING SAME
Robert H. Pintell, Congers, N.Y., assignor to Intron International, Inc., Congers, N.Y., a corporation
Filed Dec. 19, 1966, Ser. No. 602,845
9 Claims. (Cl. 331—68)

ABSTRACT OF THE DISCLOSURE

A condenser for high-frequency currents is formed from two interleaved and axially overlapping metalized dielectric foils wound into a substantially cylindrical coil body so that each end face of the cylindrical coil body exposes a spiral edge forming part of the metal layer of one or the other foil. A lead attached to one of these metal layers, on one of the end faces of the coil body, extends laterally outwardly from that end face while a second lead, similarly attached to the other metal layer on the opposite end face, passes substantially axially through the coil body to extend close to and approximately parallel to the first lead, thereby minimizing the inductivity of the supply circuit of which these leads form a part. Such a condenser may be incorporated in an oscillatory circuit of negligible parasitic inductance, advantageosuly an oscillation generator of the Colpitts type formed in the same coil by means of at least one additional metalized foil.

Specification

My present invention relates to a condenser of the extended-foil type wherein two metalized foils are overlappingly interleaved and wound into a spiral coil in such a manner that the lateral edges of their respective metal layers are exposed on opposite sides of the coil body to facilitate the attachment of supply leads to these metal layers at the two end faces.

Such spirally wound condensers, as heretofore constructed, share the disadvantages of conventional ceramic and other capacitors of having their leads separated by the condenser body proper so that at least one of these leads must be looped around the body in order to enable the two leads to be joined to the terminals of an associated current source, e.g. the electrodes of a transistor or other amplifier element. At elevated frequencies, e.g., on the order of 100 mHz., these loops exhibit a significant inductance and generate stray electrostatic and electromagnetic fields tending to dissipate energy, create interferences with adjacent circuits and lower the Q of resonant networks in which they are included.

The general object of my present invention, therefore, is to provide an improved condenser of the above-described type which avoids these drawbacks and can be used, as a lumped capacitance, in VHF and UHF systems having operating frequencies as high as 500 mHz. and more.

A more particular object of this invention is to provide a compact condenser structure which, in association with an equally compact transistor circuit, can be used to form an oscillation generator of a frequency stability approaching that of quartz-crystal-stabilized oscillators.

I have found, in accordance with my present invention, that I can eliminate the undesirable loop configuration of the supply conductors of conventional capacitor circuits by forming the coil body of the condenser with an axial channel and passing one of the leads through that channel, letting it emerge substantially axially from the coil body at the opposite face thereof where it extends close and more or less parallel to the other lead so that the two lead inductances cancel and virtually no stray field is generated. In fact, pursuant to a preferred method of manufacture, the lead axially traversing the condenser coil may be used initially as a mandrel around which the interleaved foils are wrapped to form the coil body.

A convenient way of attaching the two leads to the respective coil faces is to imbed their bared extremities in end caps of solder conductively adhering to the exposed edges of the corresponding metal layers, the latter being thus both galvanically and mechanically secured to these extremities. The two leads need not be of the same thickness; in fact, it will often be desirable for purposes of electrical symmetry to compensate for the difference in their length by making the longer lead (i.e., the one passing through the axial coil channel) of slightly greater thickness and, therefore, lower resistivity per unit length than the shorter lead.

With the suppression of stray inductances by virtue of the present improvement, it also becomes possible to place the condenser in close physical contact with actual design inductances forming part of the overall circuit and to provide a highly compact oscillator with the aid of an associated amplifier element, preferably a transistor. The transistor and the condenser may be accommodated in closely juxtaposed recesses of a metallic block of good heat conductivity, e.g., of copper, designed to dissipate thermal energy and to form a convenient ground for one of the electrodes of the transistor. I have also found that the provision of a metal housing, tightly surrounding the coil while being insulated from one or both its end caps, helps eliminate residual stray fields by the generation of circulating eddy currents along the inner housing wall which, for this purpose, is advantageously made of a highly conductive material such as a silver coating; with this expedient I have been able to extend the useful frequency range of my improved capacitor to about 800 mHz. Using commercially available metallized dielectrics for the spirally wound foils, such as polytetrafluoroethylene (Teflon), polystyrene or polyphenylene oxide, I have obtained Q values ranging from 300 to 5000 at operating frequencies of 300 mHz. The capacitance of the condenser proved to be exceedingly stable with reference to temperature, varying by not more than 0.0007% per ° C. in a range of −65° to +125° C.

The above and other features of my invention will be more fully described hereinafter with reference to the accompanying drawing in which.

Figure 1:
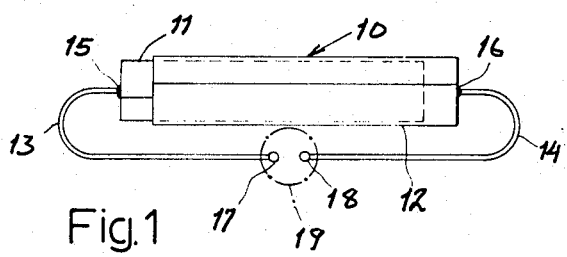
FIG. 1 is an elevational view of a condenser of the extended-foil type with conventional external connections.

In FIG. 1 I have illustrated a conventional condenser in the form of a cylindrical coil body 10 wound from a pair of dielectric foils 11, 12 which are slightly staggered in axial direction so that foil 11 projects somewhat to the left and foil 12 extends a little to the right beyond the area of overlap; these foils are metalized on one side and are so interleaved that their metal layers do not contact each other. Two leads 13, 14 are soldered to the respective metal layers at 15 and 16, extending laterally outwardly from opposite end faces of the coil body 10.

Figure 1A:
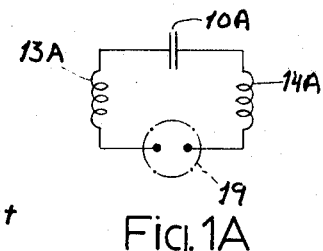
FIG. 1A is a diagram showing the equivalent circuit of the condenser and leads of FIG. 1.

When the two leads 13, 14, are brought together at respective terminals 17, 18 of an associated current source 19 (e.g., a transistor), these leads—or at least one of them— will necessarily form a loop whose inductive character becomes more pronounced with increasing operating frequencies. This has been illustrated in FIG. 1A where the inductances 13A, 14A of these leads are shown to lie in series with the capacitor 10A.

Figure 2:
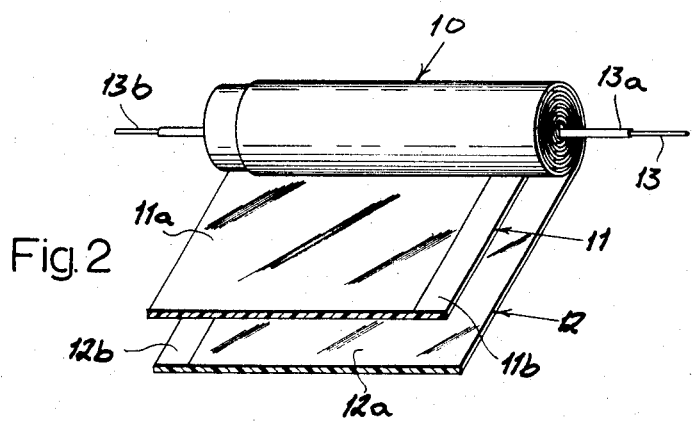
FIG. 2 is a perspective view illustrating the winding of a condenser similar to that of FIG. 1 but in accordance with the present improvement.
Figure 3A:
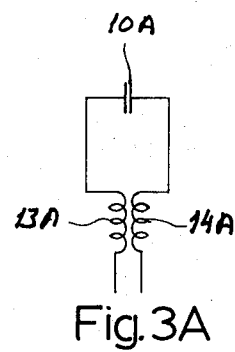
FIG. 3A is a diagram showing the equivalent circuit of the condenser and leads of FIG. 3.
Figure 3:
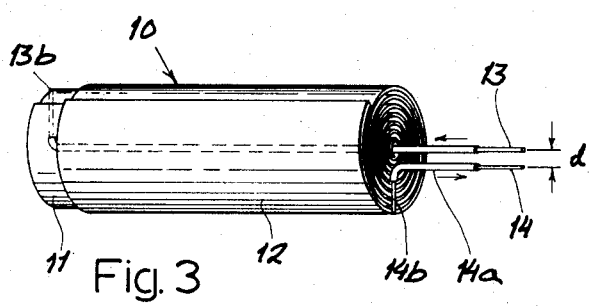
FIG. 3 is a perspective view of the fully wound condenser according to the invention.

FIG. 2 shows the foils 11, 12 together with their metal layers 11a, 12a in the process of winding. It will be noted that each of these metal layers has been set back from the concealed lateral edge of the respective dielectric foil so as to leave a nonconductive zone 11b, 12b near the exposed edge of the opposite metal layer 12a, 11a, thereby preventing the danger of short circuits when these exposed edges are sprayed with solder to form end caps as will be described in connection with FIGS. 4 and 5. The lead 13, with its insulation 13a, is being used as a mandrel for winding the foils 11, 12 to form the body 10 which, except for the position of this lead, is substantially identical with that of FIG. 1. When the coil is fully wound, as seen in FIG. 3, the bared extremity 13b of lead 13 is soldered to one or more turns of metal layer 11a on the left while a corresponding extremity 14b of lead 14, stripped of its insulation 14a, is similarly joined to the exposed edge of metal layer 12a on the right. The two leads 13, 14 extend axially outwardly next to each other, beyond the right-hand face of coil 10, with a short mutual separation $d$ which, for frequencies on the order of 500 mHz., should be a fraction of 1 mm., preferably less than 0.75 mm. These leads are traversed by current in opposite directions, as indicated by the arrows in FIG. 3, and their virtual inductances 13A, 14A are closely coupled so that their external electromagnetic and electrostatic fields substantially cancel as will be apparent from FIG. 3A. Lead 13, which is the longer of the two, is shown to be slightly thicker than lead 14 so that both conductors should have approximately the same overall impedance.

Figure 4:
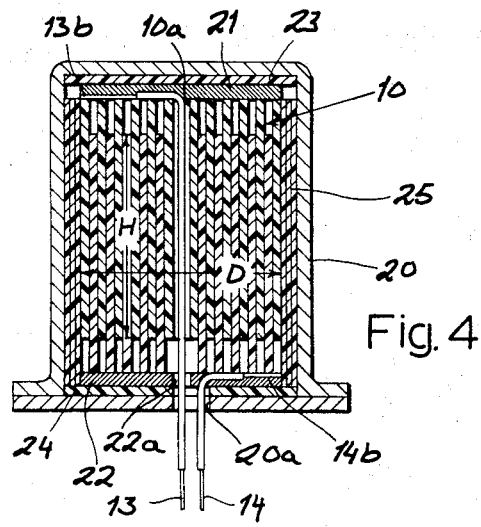
FIG. 4 is a cross-sectional view of a finished condenser structure according to the invention.

Reference will now be made to FIG. 4 which shows the coil body 10 of FIG. 3 enclosed within a conductive housing 20 and completed by two end caps of solder, designated 21 and 22, having the bare extremities 13b, 14b of wires 13 and 14 respectively imbedded therein. Cap 22 is apertured at 22a, in line with the axial channel 10a of coil 10 traversed by lead 13, and the bottom of housing 20 has a similar aperture 20a for the emergence of the two leads from the housing. The wire ends 13b, 14b may be provisionally adhered to certain turns of the respective metal layers by blobs of solder, prior to the spraying of the caps 21 and 22, or they may be subsequently immersed in the sprayed caps before the solder hardens. It will be understood that these extremities need not be straight but may be for any convenient configuration (e.g., spiral) inasmuch as they are electrically integrated in the surrounding solder.

Insulating disks 23 and 24, e.g., of Teflon or mica, separate the end caps 21, 22 from the shell 20 which is preferably internally silvered for improved conductivity to promote the generation of eddy currents for the reasons stated above. Moreover, I have shown the coil 10 surrounded by an outer wrap 25 of insulating material which may have a thermal coefficient of expansion different from that of the foils 11 and 12 in order to minimize or otherwise control the dimensional and capacitive changes of the coil with varying temperatures. The wrap 25 may include a small number of turns of dielectric material with a high thermal coefficient of expansion, either positive or negative, to establish a desired temperature response of the condenser; such materials include Mylar, mica, polycarbonates and a variety of partially fluorinated polyvinyls. Metal sheets, e.g., of aluminum, brass, lead or zinc, may also be used in place of or in addition to the dielectric wrap 25 to control the thermal behavior of the unit.

I have found, rather surprisingly, that optimum performance in terms of suppression of stray fields is obtained if the diameter D of the coil 10 is substantially equal to its axial height H.

Figure 5A:
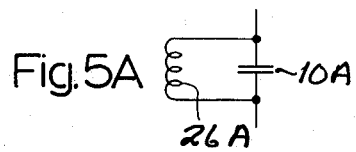
FIG. 5A is a diagram showing the equivalent circuit of the arrangement of FIG. 5.
Figure 5:
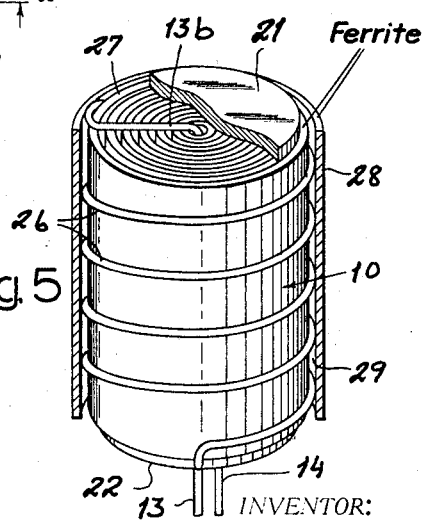
FIG. 5 is a perspective view (parts broken away) of my improved condenser in association with an external inductance.

In FIG. 5 I have shown how the condenser 10 can be intimately associated with an external inductance, in the form of a helically wound wire 26, to form a parallel-resonant circuit 10A, 26A as indicated in the diagram of FIG. 5A. The ends of the wire 26 are imbedded in the end caps 21, 22 so that the inductance represented by this wire is connected across the leads 13, 14. In fact, the wire 26 may be an integral extension of the bare end 13b of lead 13. Since the generation of eddy currents in the immediate vicinity of an inductance is undesirable and would destroy the Q of the circuit, I prefer to separate the helically wound wire 26 from the condenser body 10 by a cylindrical ferrite sleeve or shell 27 and to encase it in another such shell 28, the two shells forming a narrow annular clearance 29. A typical circuit constructed in this fashion, resonant at 470 mHz., was found to have a Q of 1200.

Figure 6:
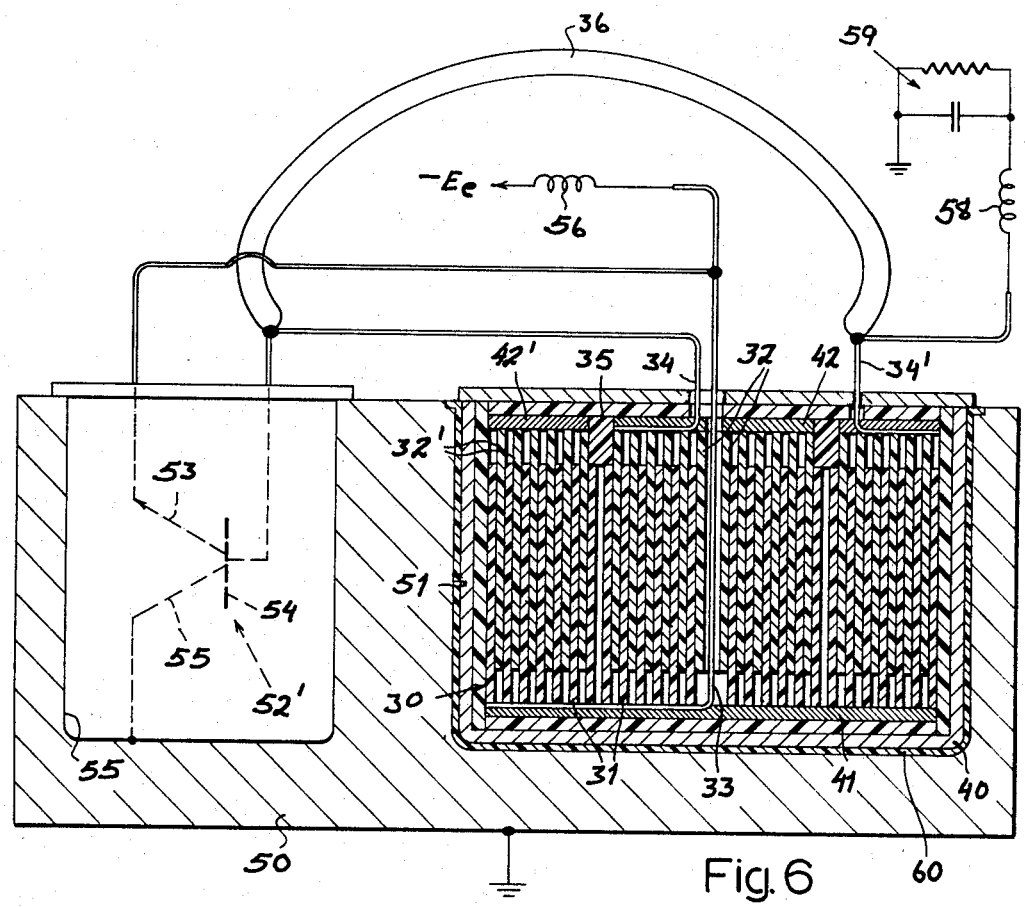
FIG. 6 is a cross-sectional view similar to FIG. 4 but showing additional elements of an oscillator circuit incorporating a modified version of my improved condenser.
Figure 6A:
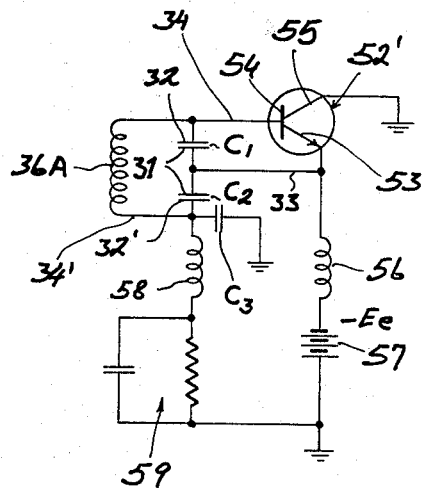
FIG. 6A is a diagram showing the equivalent circuit of the system of FIG. 6.

FIG. 6 illustrates a modified condenser 30 which, while being generally similar to condenser 10 described above, is wound from three metallized dielectric foils 31, 32, 32' which form two concentric condensers $C_1$ and $C_2$ (see FIG. 6A). The exposed metallic edge of foil 31 is bonded onto a solder cap 41 from which a lead 33 passes axially through the coil 30. A similar cap 42 makes conductive and mechanical contact with the exposed metallic edge of foil 32 and has a lead 34 imbedded therein which, on emerging from the surrounding metal housing 40, passes axially next to the lead 33. Cap 42 is separated by an insulating ring 35 from an annular solder cap 42' which in like manner engages the metallic edge of foil 32' and is rigid with a lead 34'. An inductance 36, in the form of a curved metal bar of thermally stable material such as silver-plated Invar, is soldered to the leads 34 and 34'; the spacing of the latter lead from conductors 33, 34 is not objectionable since the resulting inductance may be considered part of the impedance of yoke 36.

Housing 40 is received, with interposition of an insulating envelope 60, in a cylindrical recess 51 of a copper block 50 which has another such recess 52 nearby to accommodate the housing of a transistor 52' indicated diagrammatically in dot-dash lines in FIG. 6. The emitter 53 and the base 54 of this transistor, here shown to be of the NPN type, are respectively connected to leads 33, 34 while its collector 55 is grounded to block 50. Lead 33 is also connected, via a high-frequency choke 56, to a source of emitter potential $-E_e$ illustrated in FIG. 6A as the negative pole of a battery 57. A similar choke 58 connects lead 34' to ground via a conventional biasing circuit 59.

In the equivalent circuit diagram of FIG. 6A the inductance of yoke 36 has been designated 36A. The circuit will be recognized as a Colpitts oscillator with two capacitances $C_1$, formed by foils 31, 32, and $C_2$, formed by foils 31, 32', serially connected across inductance 36A. A large coupling condenser $C_3$ returns the tuned circuit $C_1$, $C_2$, 36A to ground and thus to the collector 55, this condenser being represented in FIG. 6 by the capacitance between block 50 and housing 40 which in turn is conductively secured to lead 34'. A capacitance ratio of 2:1 for the condensers $C_2$ and $C_1$ has been found highly satisfactory. A frequency drift of less than 1000 cycles at 500 megacycles has been observed with such an oscillator over a temperature range of —40° to 100° C.

My improved high-frequency condenser may also be used for a variety of other lumped circuit components, such as high-pass and low-pass filters.

I claim:

1. A condenser for high-frequency currents, comprising a pair of interleaved dielectric foils spirally wound into a substantially cylindrical coil having an axial channel, said foils being provided with axially staggered metal layers each having an exposed lateral edge at a respective face of said coil, a first lead conductively and mechanically connected with the exposed edge of one layer at one of said faces, said first lead being bent outwardly from said one of said faces in the vicinity of the coil axis, a second lead conductively and mechanically connected with the exposed edge of the other layer at the other of said faces, said second lead traversing said channel and extending substantially parallel and close to said first lead beyond said one of said faces, said coil being provided with end caps of solder respectively overlying said faces in bonded relationship with the respective metal layers, said first and second leads being partly imbedded in said end caps, a first cylindrical ferrite shell surrounding said coil and an inductive connection between said end caps passing externally of said first shell, and a second cylindrical ferrite shell encasing said inductive connection within a narrow anular clearance between the two shells.

2. A condenser as defined in claim 1 wherein said foils are wrapped around said second lead.

3. A condenser as defined in claim 1 wherein said second lead is of greater thickness than said first lead.

4. A condenser as defined in claim 1, further comprising a generally cylindrical metal housing tightly enclosing said coil in insulated relationship with at least one of said end caps, said housing having an apertured bottom traversed by said leads.

5. A condenser as defined in claim 1, further comprising an outer wrap enveloping said coil within said housing, said wrap consisting of a material with a thermal coefficient of expansion different from that of the dielectric of said foils.

6. A condenser as defined in claim 1 wherein the mutual spacing of said leads beyond said one of said faces is less than 1 mm.

7. A condenser as defined in claim 1 wherein the diameter of said coil is substantially equal to its axial length.

8. An oscillator circuit comprising a condenser with a pair of interleaved dielectric foils spirally wound into a substantially cylindrical coil having an axial channel, said foils being provided with axially staggered metal layers each having an exposed lateral edge at a respective face of said coil, a first lead conductively and mechanically connected with the exposed edge of one layer at one of said faces, said first lead being bent outwardly from said one of said faces in the vicinity of the coil axis, a second lead conductively and mechanically connected with the exposed edge of the other layer at the other of said faces, said second lead traversing said channel and extending substantially parallel and close to said first lead beyond said one of said faces; a metallic block with a substantially cylindrical first recess receiving said coil and a second recess adjacent said first recess; and an amplifier element disposed in said second recess, said leads being connected to electrodes of said amplifier element.

9. An oscillator circuit as defined in claim 8 wherein said coil includes at least one further foil forming part of a second condenser with a metal layer connected to one of said leads, said second condenser having a third lead forming part of an inductive connection to one of the other two leads.

References Cited

UNITED STATES PATENTS

| 2,918,633 | 12/1959 | Schenker et al. | 333—70 |
| 3,182,238 | 5/1965 | Toder et al. | 317—260 |
| 3,185,905 | 5/1965 | Sternbeck | 317—256 |

OTHER REFERENCES

McCutchen et al.; Electronic Engineering, "Low Impedance Capacitor Design," p. 351, June 1961.

JOHN KOMINSKI, *Primary Examiner.*